United States Patent
Voss et al.

(10) Patent No.: US 12,197,845 B2
(45) Date of Patent: *Jan. 14, 2025

(54) USER-SPECIFIED REPLACEMENT OF TERMS IN MESSAGING

(71) Applicant: Snap Inc., Santa Monica, CA (US)

(72) Inventors: Jeremy Voss, Los Angeles, CA (US); Christie Marie Heikkinen, Sherman Oaks, CA (US); Daniel Rakhamimov, Brooklyn, NY (US); Laurent Desserrey, Los Angeles, CA (US); Susan Marie Territo, Los Angeles, CA (US); Edward Koai, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,574

(22) Filed: Oct. 26, 2023

(65) Prior Publication Data

US 2024/0054283 A1 Feb. 15, 2024

Related U.S. Application Data

(63) Continuation of application No. 17/461,244, filed on Aug. 30, 2021, now Pat. No. 11,822,874, which is a
(Continued)

(51) Int. Cl.
*G06F 3/048* (2013.01)
*G06F 3/0482* (2013.01)
(Continued)

(52) U.S. Cl.
CPC .......... *G06F 40/166* (2020.01); *G06F 3/0482* (2013.01); *H04L 51/216* (2022.05); *H04L 51/52* (2022.05)

(58) Field of Classification Search
CPC .............................. H04L 51/216; H04L 51/52
See application file for complete search history.

(56) References Cited

U.S. PATENT DOCUMENTS 9,426,102 B1 8/2016 Wong et al.
10,243,910 B2 * 3/2019 Swink ................. G06F 3/04883
(Continued)

FOREIGN PATENT DOCUMENTS

WO WO-2018045341 A1 3/2018

OTHER PUBLICATIONS

Frosch et al., How secure is TextSecure?, 2016, IEEE, 16 pages. (Year: 2016).*
(Continued)

*Primary Examiner* — Linh K Pham
(74) *Attorney, Agent, or Firm* — Schwegman Lundberg & Woessner, P.A.

(57) ABSTRACT

Aspects of the present disclosure involve a system comprising a computer-readable storage medium storing a program and method for replacing text in a message thread. The program and method provide for receiving an indication of user input provided by a first user, the user input comprising a text-based term for updating a message thread between the first user and a second user; determining that the text-based term is included within a set of predefined terms, each predefined term within the set of predefined terms having corresponding replacement content for including in the message thread, the replacement content having been specified by the first or second user with respect to messages exchanged between the first and second user; and providing, in response to the determining and based on the set of predefined terms, the replacement content corresponding to the text-based term within the message thread.

20 Claims, 13 Drawing Sheets

Related U.S. Application Data continuation of application No. 16/729,738, filed on Dec. 30, 2019, now Pat. No. 11,106,863.

(51) Int. Cl.
*G06F 40/166* (2020.01)
*H04L 51/216* (2022.01)
*H04L 51/52* (2022.01)

(56) References Cited

U.S. PATENT DOCUMENTS

| | | | |
|---|---|---|---|
| 10,582,036 B2 | 3/2020 | Sarafa et al. | |
| 10,725,626 B2* | 7/2020 | Meixner | H04L 51/046 |
| 10,812,429 B2* | 10/2020 | Ahuja | H04L 51/52 |
| 11,106,863 B1 | 8/2021 | Voss et al. | |
| 11,822,874 B2 | 11/2023 | Voss et al. | |
| 2007/0174045 A1* | 7/2007 | Kao | G06F 40/295 |
| | | | 704/4 |
| 2010/0179991 A1 | 7/2010 | Lorch et al. | |
| 2015/0113073 A1 | 4/2015 | Chan et al. | |
| 2015/0295873 A1 | 10/2015 | Orr | |
| 2015/0381571 A1* | 12/2015 | Plasse | H04L 51/046 |
| | | | 726/26 |
| 2016/0132990 A1* | 5/2016 | Zhang | G06T 3/18 |
| | | | 345/646 |
| 2017/0195274 A1* | 7/2017 | Liberty | H04L 51/42 |
| 2017/0337176 A1* | 11/2017 | Cietwierkowski | G06Q 10/107 |
| 2017/0337184 A1* | 11/2017 | Quah | G06F 16/313 |
| 2017/0346938 A1 | 11/2017 | Allen et al. | |
| 2018/0081529 A1 | 3/2018 | Zhang et al. | |
| 2018/0097755 A1 | 4/2018 | Mody et al. | |
| 2018/0302358 A1 | 10/2018 | Nambiar et al. | |
| 2018/0356957 A1* | 12/2018 | Desjardins | G06F 40/274 |
| 2018/0366013 A1 | 12/2018 | Arvindam | |
| 2018/0367484 A1* | 12/2018 | Rodriguez | G06Q 10/101 |
| 2019/0258381 A1 | 8/2019 | Desjardins | |
| 2019/0281069 A1* | 9/2019 | Hong | H04L 63/0428 |
| 2020/0356365 A1 | 11/2020 | Pezaris | |
| 2022/0058335 A1 | 2/2022 | Voss et al. | |

OTHER PUBLICATIONS

"U.S. Appl. No. 16/729,738, Examiner Interview Summary mailed Mar. 2, 2021", 2 pgs.

"U.S. Appl. No. 16/729,738, Non Final Office Action mailed Dec. 22, 2020", 12 pgs.

"U.S. Appl. No. 16/729,738, Notice of Allowance mailed Apr. 27, 2021", 11 pgs.

"U.S. Appl. No. 16/729,738, Response filed Mar. 22, 2021 to Non Final Office Action mailed Dec. 22, 2020", 8 pgs.

"U.S. Appl. No. 17/461,244, Final Office Action mailed Dec. 13, 2022", 12 pgs.

"U.S. Appl. No. 17/461,244, Non Final Office Action mailed Mar. 30, 2023", 7 pgs.

"U.S. Appl. No. 17/461,244, Non Final Office Action mailed May 23, 2022", 9 pgs.

"U.S. Appl. No. 17/461,244, Notice of Allowance mailed Jul. 14, 2023", 10 pgs.

"U.S. Appl. No. 17/461,244, Response filed Mar. 8, 2023 to Final Office Action mailed Dec. 13, 2022", 8 pgs.

"U.S. Appl. No. 17/461,244, Response filed Jun. 22, 2023 to Non Final Office Action mailed Mar. 30, 2023", 7 pgs.

"U.S. Appl. No. 17/461,244, Response filed Aug. 23, 2022 to Non Final Office Action mailed May 23, 2022", 8 pgs.

Authors, et al., "A system and method for responding to message threads and emails", (2011), 6 pgs.

\* cited by examiner

USER-SPECIFIED REPLACEMENT OF TERMS IN MESSAGING

CROSS-REFERENCE TO RELATED APPLICATION

This application is a continuation of U.S. patent application Ser. No. 17/461,244, filed Aug. 30, 2021, which application is a continuation of U.S. patent application Ser. No. 16/729,738, filed Dec. 30, 2019, now issued as U.S. Pat. No. 11,106,863, which are incorporated by reference herein in their entireties.

TECHNICAL FIELD

The present disclosure relates generally to messaging systems, including configuring messaging systems to replace terms in messaging.

BACKGROUND

Messaging systems provide for the exchange of message content between users. For example, a messaging system allows a user to exchange message content with one or more other users in a message thread.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging system typically allow users to exchange content items (e.g., messages, images and/or video) with one another in a message thread. A messaging system may work in conjunction with a social network system which is configured to maintain the identity of users and their corresponding relationships (e.g., friend relationships). In some cases, a group of users (e.g., two or more friends) may wish to have more engaging experience with respect to exchanging content within a message thread.

The disclosed embodiments provide for replacing particular terms and/or phrases with user-specified substitute content (e.g., other terms and/or images, video, audio and the like) in the message thread. For example, the users may consider the particular terms as code words, inside jokes, or terms with special meaning by the users in the group. Moreover, the selected terms and replacement content are specific to the group of users (e.g., the users included in a specific message thread).

One or more users in the group may specify the terms, and the replacement content for those terms, with respect to messaging within the group. When a user enters a predefined term for submitting to the message thread, the term is replaced with the corresponding replacement content within the message thread. The replacement content may be highlighted within the message thread. The replacement content may also be user selectable, such that the original term and/or the user who defined the term are displayed when the replacement content in the message thread is selected. In this manner, user engagement and/or interest with respect to messaging may be improved.

Figure 1:
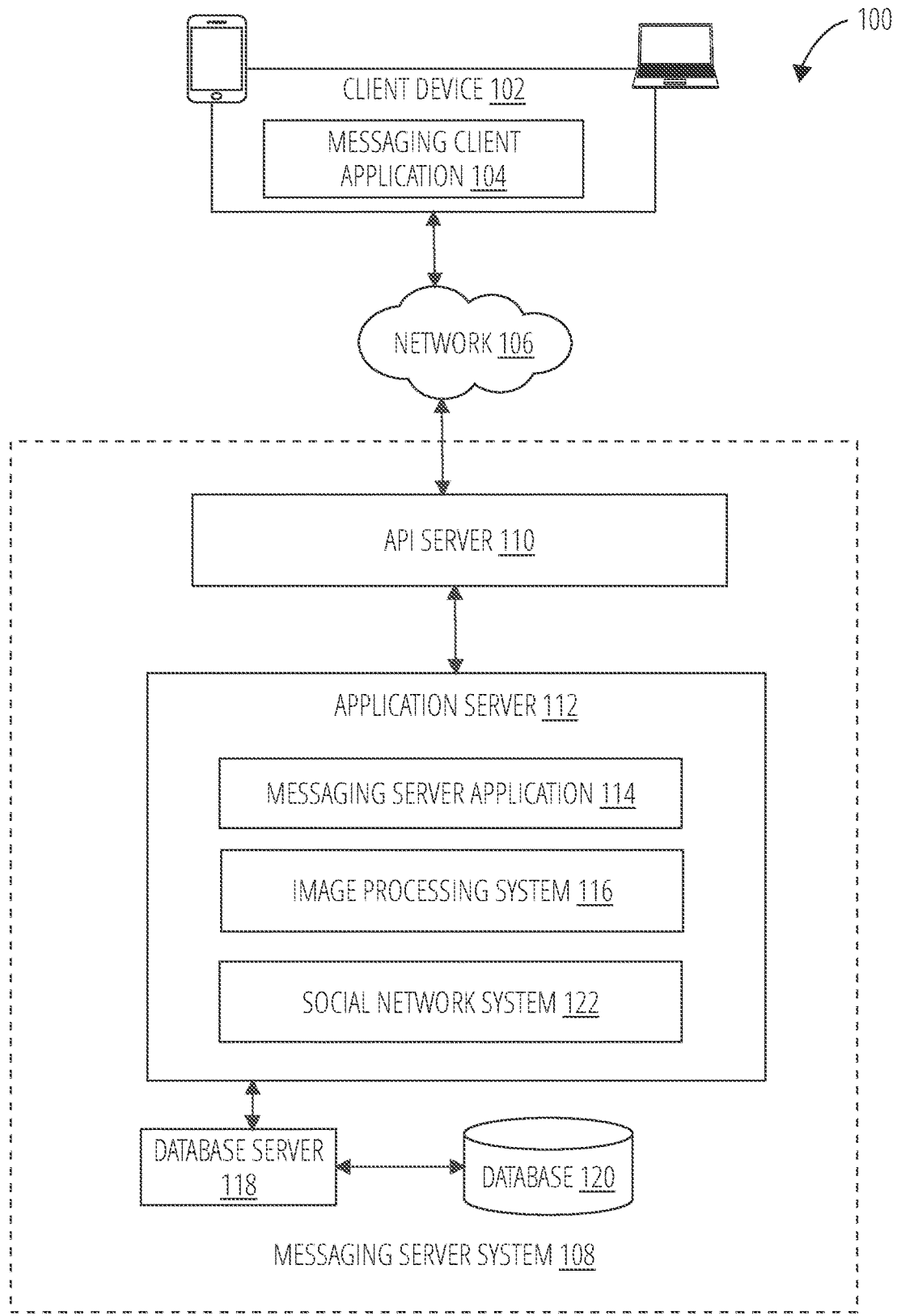
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between the messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., Story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called Stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
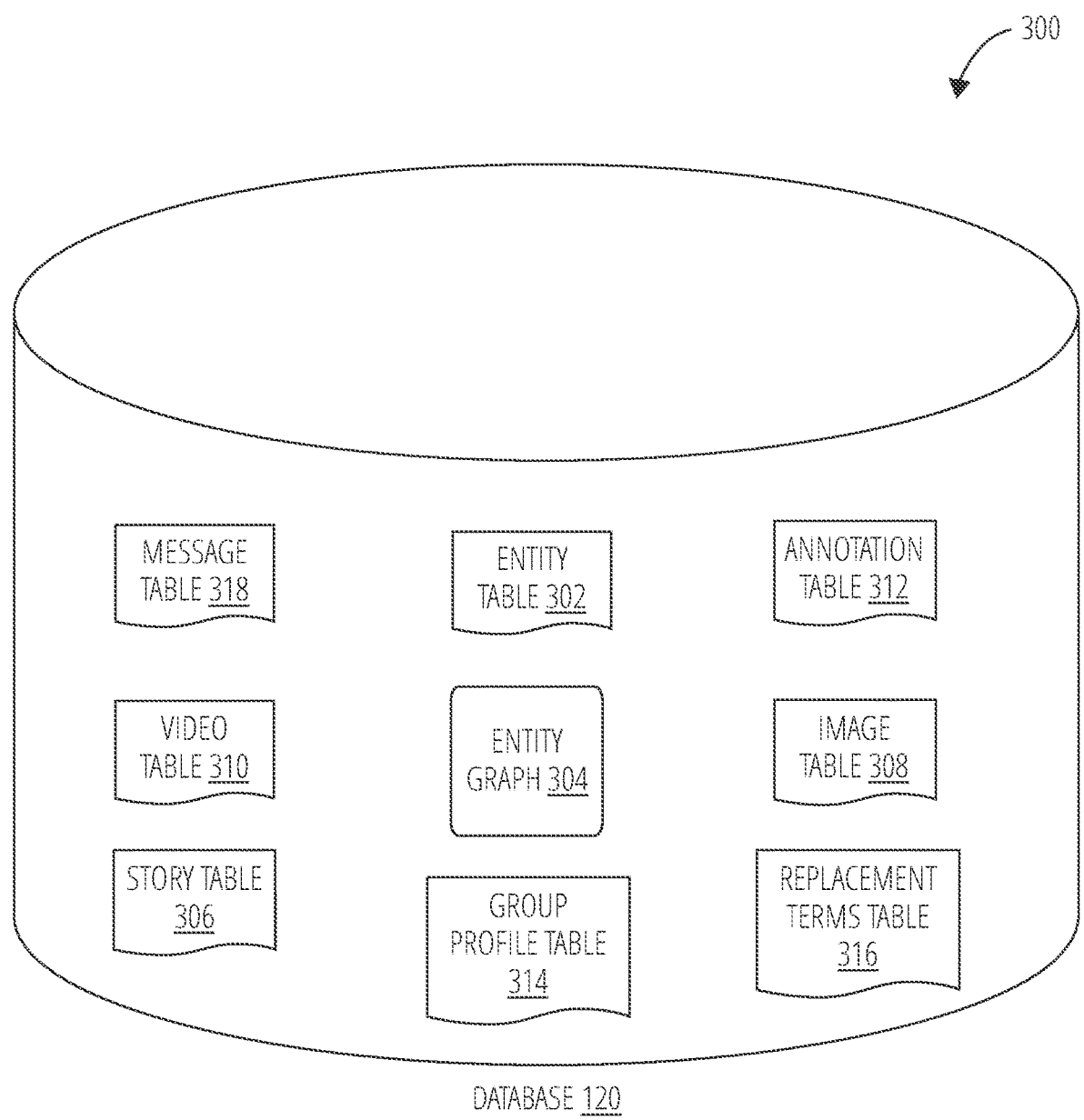
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user. Such other users may be referred to as the user's friends. In some embodiments, the social network system 122 may access location information associated with each of the user's friends to determine where they live or are currently located geographically.

Figure 2:
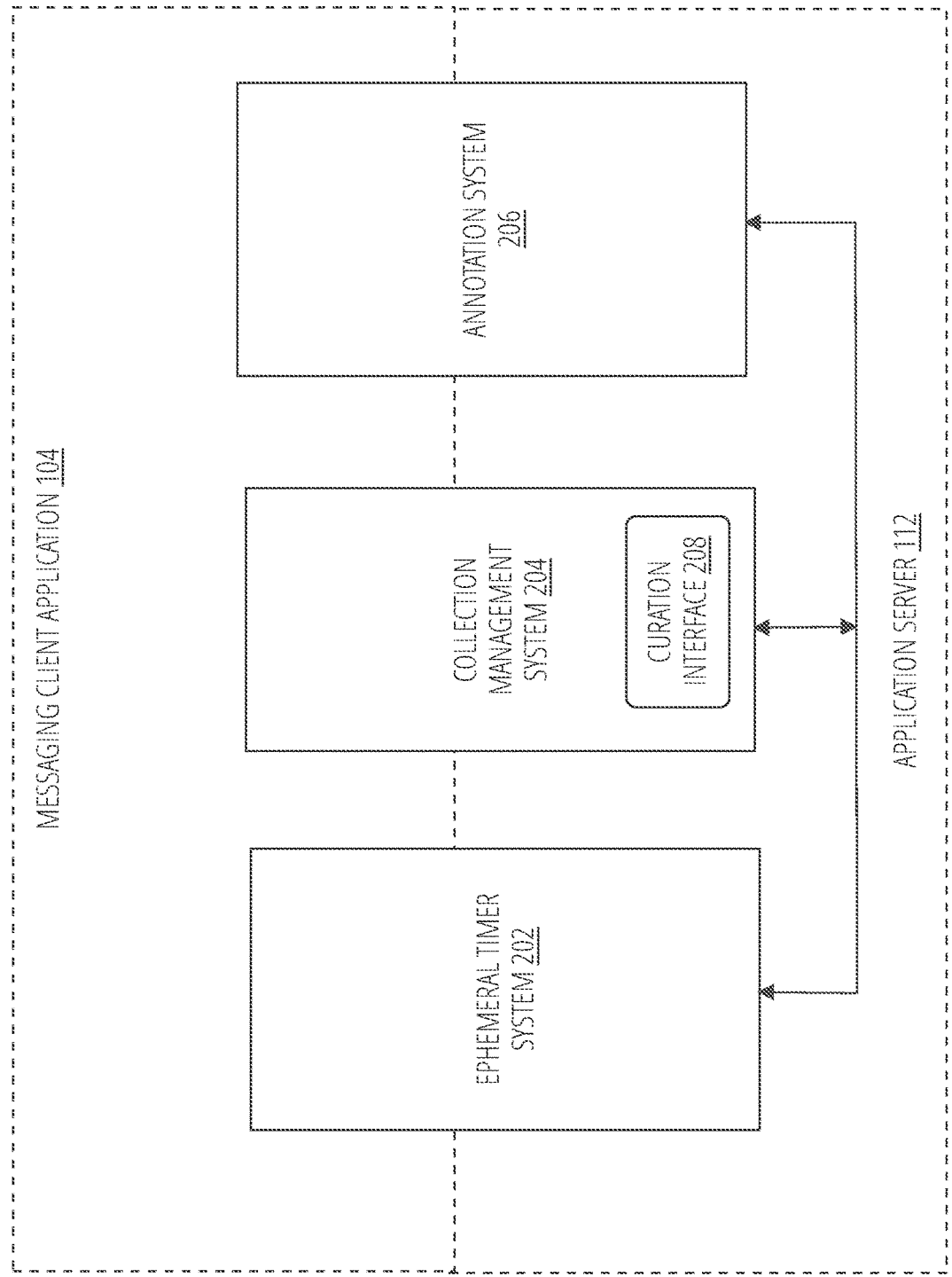
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 318. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 318. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the user interface of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client application 104, to contribute content to a particular live Story. The live Story may be identified to the user by the messaging client application 104, based on his or her location. The end result is a "live Story" told from a community perspective.

A further type of content collection is known as a "location Story", which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

A group profile table 314 stores data regarding group profiles, where a group profile includes saved information that is common to a group of at least two users (e.g., and where a group profile for two users may also be referred to as a friendship profile). Such information may include message content, such as but not limited to, images, videos, audio files, attachments, and messages (e.g., text-based messages), with any corresponding annotation data, exchanged within one or more message thread(s) with respect to a group of users. The saved information included within a group profile may further include shared settings that apply to the group, such that an update to a shared setting by one group user applies to all users within the group.

In some embodiments, messages, images, videos and/or attachments may be added to the group profile in response to a specific request from one of the users in the group. For example, if the users in the group exchange message content (e.g., messages, images, videos and/or attachments), all of the message content, by default, may typically be automatically deleted and removed from storage after a specified time period (e.g., one hour, one minute, one second, etc.). However, if prior to the specified time period when the message content is automatically deleted, one of the users in the group selects certain message content (e.g., one or more messages, images, videos and/or attachments) for permanent retention (e.g., via a "save" interface), the selected message content is added to the group profile. The saved message content may be viewed by any one of the users in the group at any given time.

The replacement terms table 316 stores predefined terms (e.g., text-based terms and/or phrases), together with corresponding replacement content (e.g., terms, image, video, audio and any corresponding annotation(s)) for each term. The predefined terms and replacement content may be user-specified.

Figure 4:
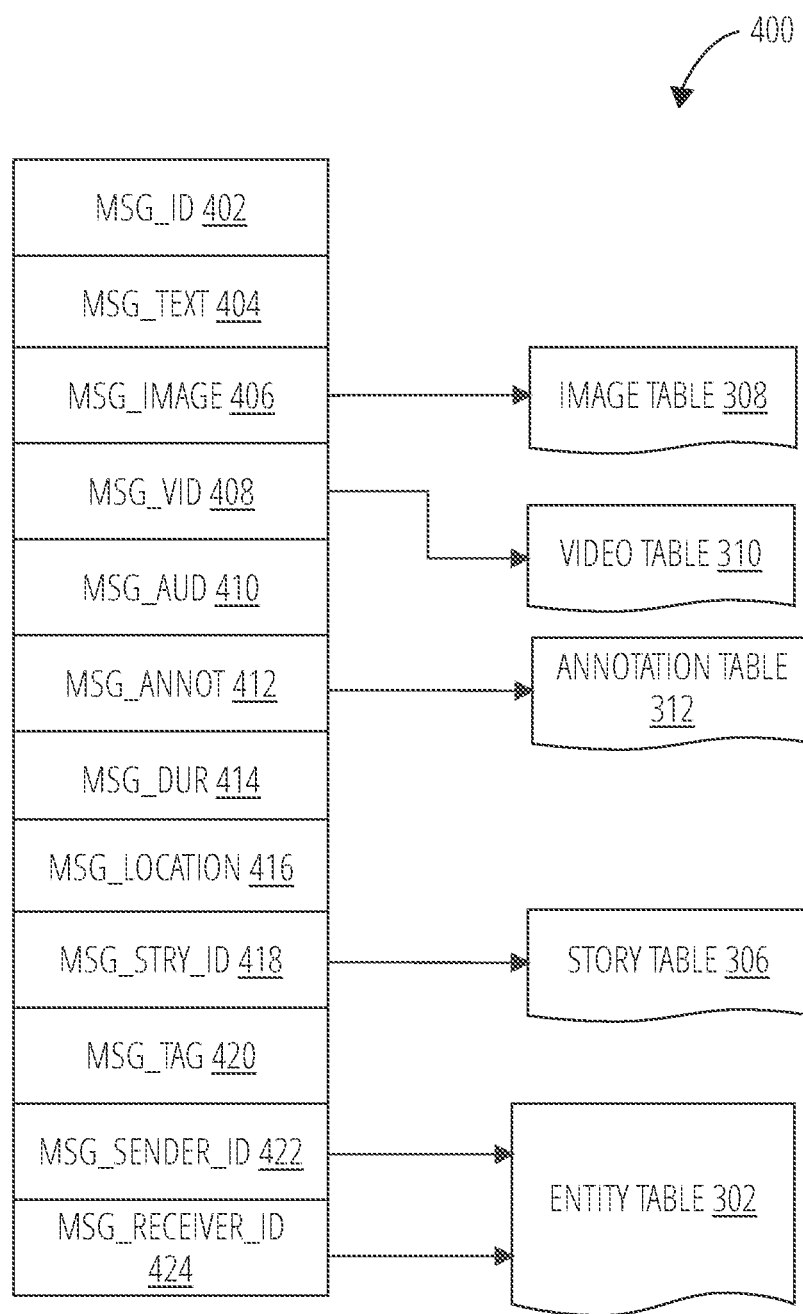
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 318 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

Message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
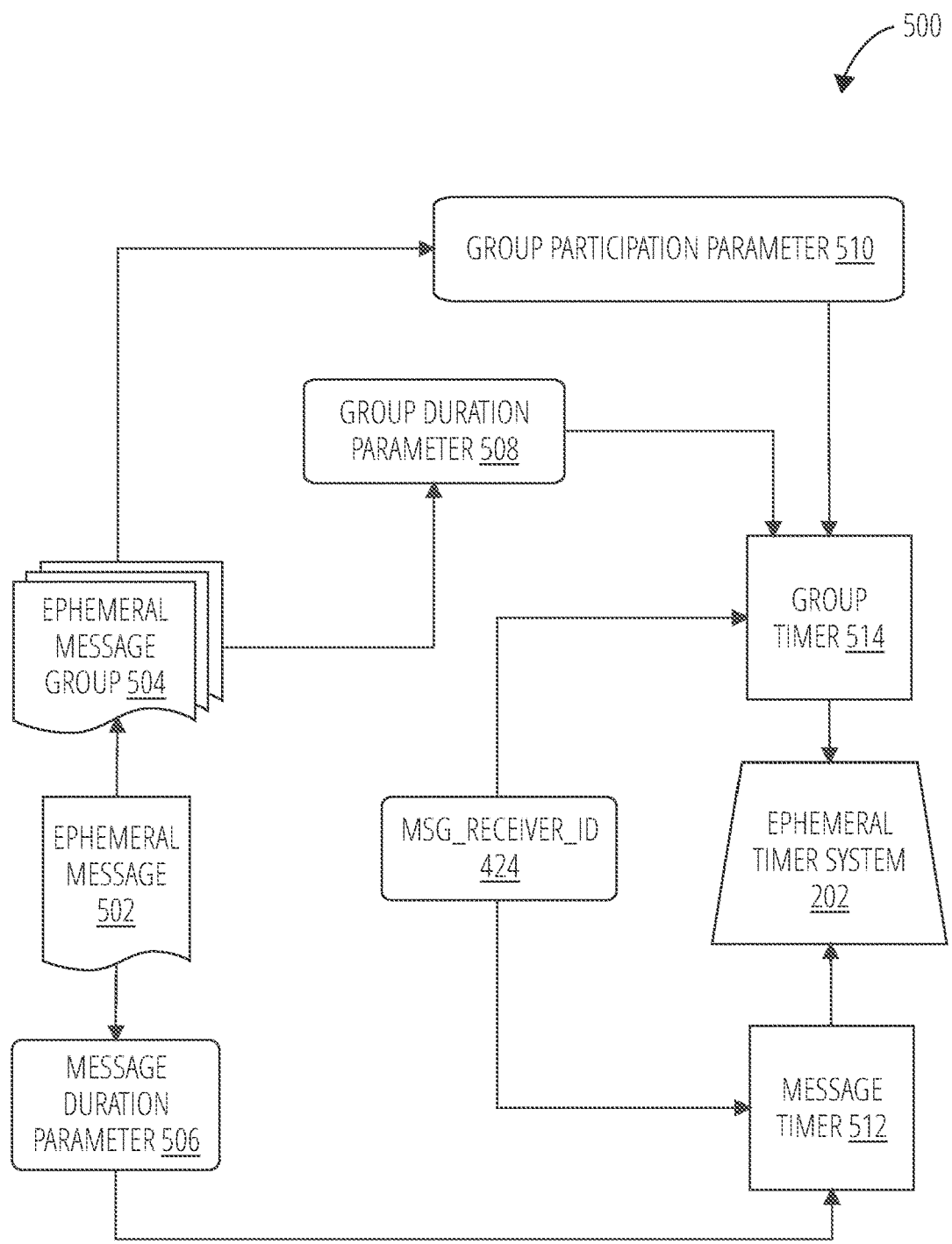
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
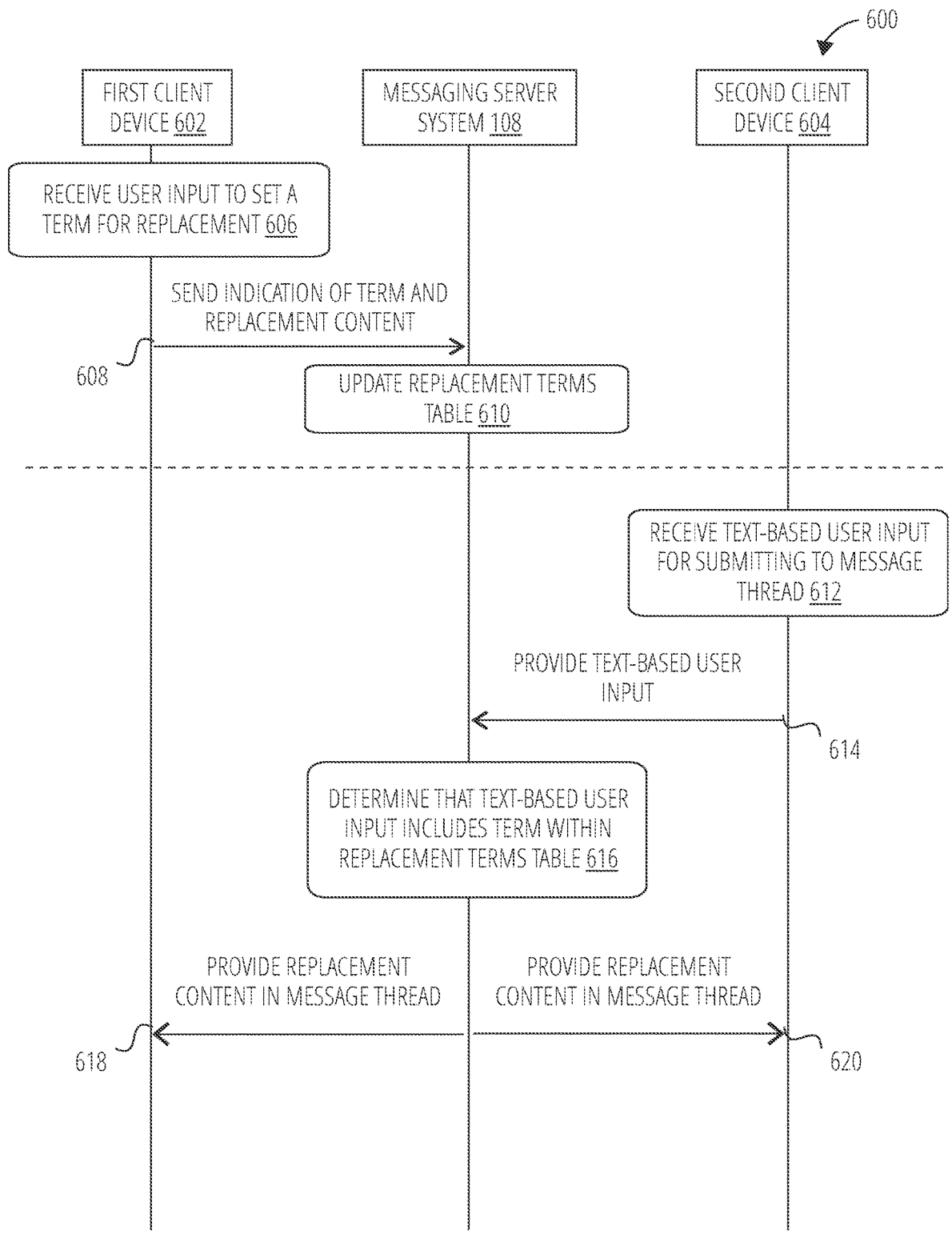
FIG. 6 is an interaction diagram illustrating a process for replacing a term with replacement content in a message thread, in accordance with some example embodiments.

FIG. 6 is an interaction diagram illustrating a process 600 for replacing a term with replacement content in a message thread, in accordance with some example embodiments. For explanatory purposes, the process 600 is primarily described herein with reference to a first client device 602 and a second client device 604 (e.g., each of which may correspond to a respective client device 102), and with reference to the messaging server system 108. However, the process 600 is not limited to the first client device 602, the second client device 604 and the messaging server system 108. Moreover, one or more blocks (or operations) of the process 600 may be performed by one or more other components of the first client device 602, the second client device 604 or the messaging server system 108, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

Each of the first client device 602 and the second client device 604 may have instances of the messaging client application 104 installed thereon. The first client device 602 and the second client device 604 may be associated with a respective first user and second user of the messaging server system 108. For example, the first user may be associated with a first user account of the messaging server system 108, and the second user may be associated with a second user account of the messaging server system 108.

As noted above, the first and second users may be identified by the messaging server system 108 based on unique identifiers (e.g., a messaging system identifier, email address and/or a device identifier) associated with respective user accounts for the first and second users. In addition, the messaging server system 108 may implement and/or work in conjunction with a social network system 122 which is configured to identify other users (e.g., friends) with which a particular user has relationships. The group profile table 314 may indicate a group profile (e.g., friendship profile) corresponding to the first and second users, where the group profile stores content items (e.g., images, videos, attachments, and messages) and/or settings that are shared between the first user and the second user. For example, the first and/or second user may have selected to save the content items, so as not to expire and automatically be removed by the ephemeral timer system 202.

In the example of FIG. 6, operations 606-610 may correspond to a first phase and operations 612-620 may correspond to a second phase. The first phase relates to adding a term to the replacement terms table 316, such that subsequent user input of the term (e.g., via a message input box) results in replacement content being displayed in a message thread. Moreover, the second phase relates to receiving the term as user input for submitting to the message thread, and replacing the term with the replacement content in the message thread. It may be understood that the second phase may occur shortly after the first phase, or after an extended period of time after the first phase. As such, FIG. 6 includes a dashed line separating the first phase and the second phase for illustrative purposes.

With respect to the first phase, the first user of the messaging client application 104 running on the first client device 602 may specify a term and replacement content for the term (block 606). The term may correspond to a text-based term (e.g., a word, phrase, code or the like). Moreover the replacement content may correspond to one or more of: text (e.g., a replacement word, phrase, code or the like), image, video, audio and/or any associated annotations (e.g., per the annotation table 312).

In some embodiments, the term and replacement content are specific and/or unique to messaging between the first and second user. As such, while the term may be automatically replaced with the replacement content in a message thread between the first and second users, the term may not be similarly replaced in message thread(s) between other users or combinations of users, since the other message thread(s) are not necessarily associated with the term and its replacement content. For example, the term may not be automatically replaced with respect to messaging between: the first user and a third user; the second user and a third user; or the first user, the second user and a third user (e.g., unless the third user was already included in the message thread between the first and second users).

The messaging client application 104 running on the first client device 602 may provide different user interfaces by which the first user may specify the term and replacement content. For example, the message thread provided by the messaging client application 104 may include an interface which allows user(s) to add, modify and/or delete terms and their respective replacement content. In another example, a group profile interface may provide interfaces to add, modify and/or delete terms and their respective content. In this regard, the group profile interface may be used to view content items that are shared and saved between the group of the first user and the second user, and may include settings that are shared by the group. Terms and their respective replacement content may correspond to a shared setting with respect to a group profile interface.

The modifying and deleting of terms may be provided via a list interface, which lists all terms and their respective replacement content. Thus, a given user may select a particular term from the list for modifying and/or deleting.

At operation 608, the first client device 602 sends an indication of the term and replacement content to the messaging server system 108. The messaging server system 108 updates the replacement terms table 316 based on the term and replacement content provided by the first client device 602 (block 610). For example, the messaging server system 108 may provide for adding an entry (e.g., a term and its replacement content) to the replacement terms table 316. The messaging server system 108 is configured to add, modify and/or delete entries from the replacement terms table 316.

With respect to operations 612-620 corresponding to the above-noted second phase, a user may subsequently provide input (e.g., within a message input box) that includes the term for submitting to the message thread between the first and second users. In the example of FIG. 6, the second user at the second client device 604 provides such input, but it is understood that operations 612-620 may alternatively or in addition be performed by the first user at the first client device 602. As discussed below with respect to FIGS. 7-10, the messaging client application 104 running on the second client device 604 may provide for a message thread interface which includes a message input box for user submission of content (e.g., text) to a message thread.

Thus, the second client device 604 may receive (e.g., via the message input box), text-based user input for submitting to a message thread (block 612). The second client device 604 may provide the text-based user input to the messaging server system 108 (operation 614). The messaging server system 108 may be configured to query or otherwise access the replacement terms table 316 to determine if a given term (e.g., a text-based term) has corresponding replacement content. Thus, in response to receiving the text-based input from the second client device 604, the messaging server system 108 determines if the text-based input includes a term which is included in the replacement terms table 316 (block 616).

In the example of FIG. 6, the term is included in the replacement terms table 316. As such, the messaging server system 108 determines the corresponding replacement content based on the replacement terms table 316, and provides the replacement content within the message thread for the first and second users (operation 618 and operation 620). For example, the messaging client application 104 at each of the first client device 602 and the second client device 604, in conjunction with the messaging server system 108, may display the replacement content in lieu of the user-entered term within the message thread. As noted above, the replacement content may correspond to replacement text (e.g., as discussed below with respect to FIG. 8) and/or another type of content (e.g., an image, as discussed below with respect to FIG. 10).

As discussed below with respect to FIG. 9, the messaging server system 108 may provide for highlighting or otherwise differentiating the display of the replacement content within the message thread. Moreover, the highlighted replacement content may be user-selectable (e.g., a button or link) such that selection thereof provides for display of the term that was replaced and/or an option to modify or delete the term and its replacement content. In this manner, the second user may be notified of a term that has been assigned replacement content, and the second user may opt to change/delete the term and respective content for the group duration parameter 508.

Although FIG. 6 is described herein with respect to a message thread with a group including the first and second user, the subject system is not limited to two users per group. Thus, the blocks and operations for the process 600 may be applied to a group of users larger than two. Any of the users in the group may specify replacement content for term(s) with respect to a message thread for the group, such that each user in the group would view the replacement content in lieu of the respective user-inputted term when viewing the message thread at their respective device.

Figure 7:
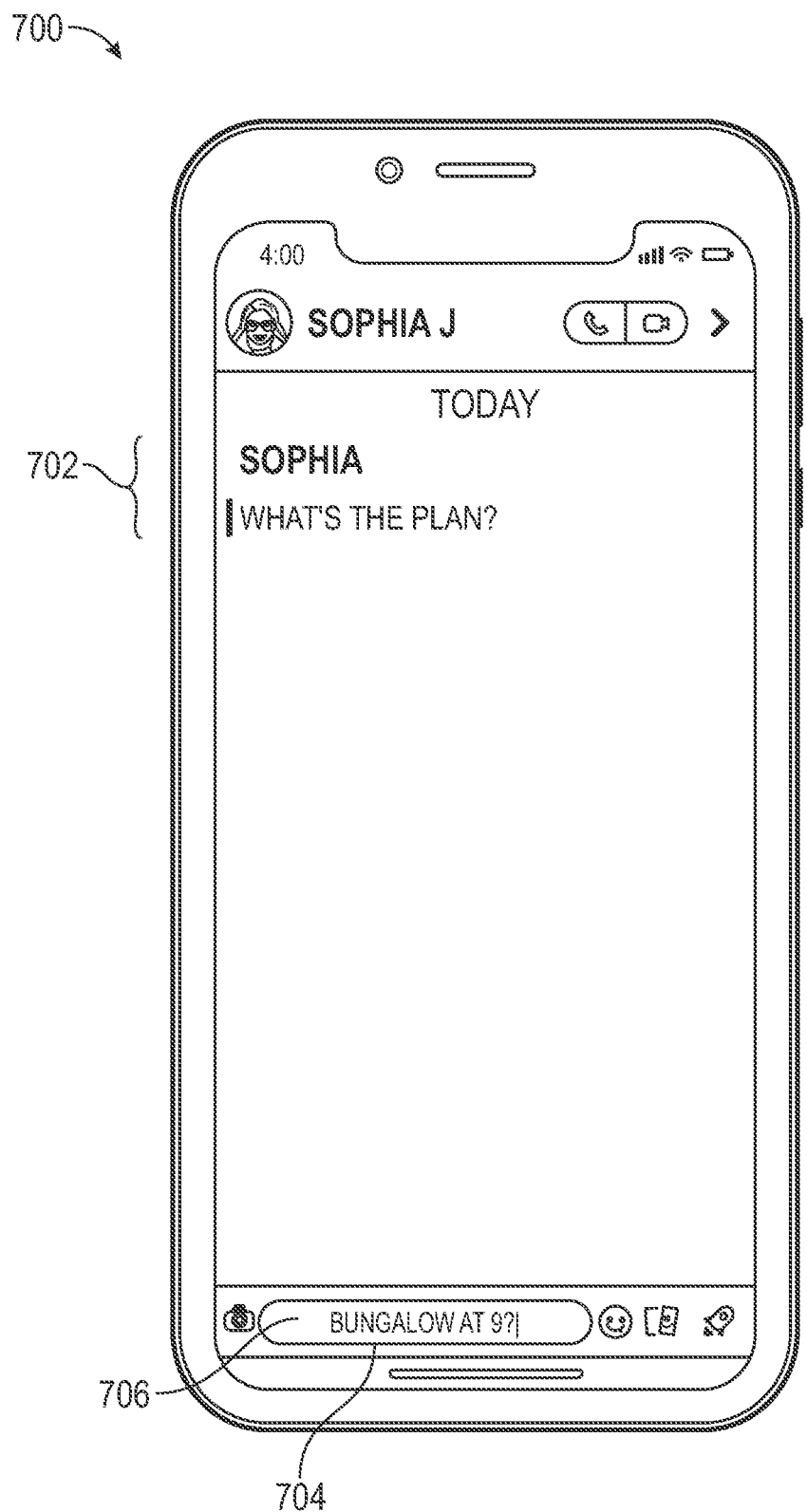
FIG. 7 illustrates a message thread interface in which a text-based term is provided within a message input box, in accordance with some example embodiments.
Figure 8:
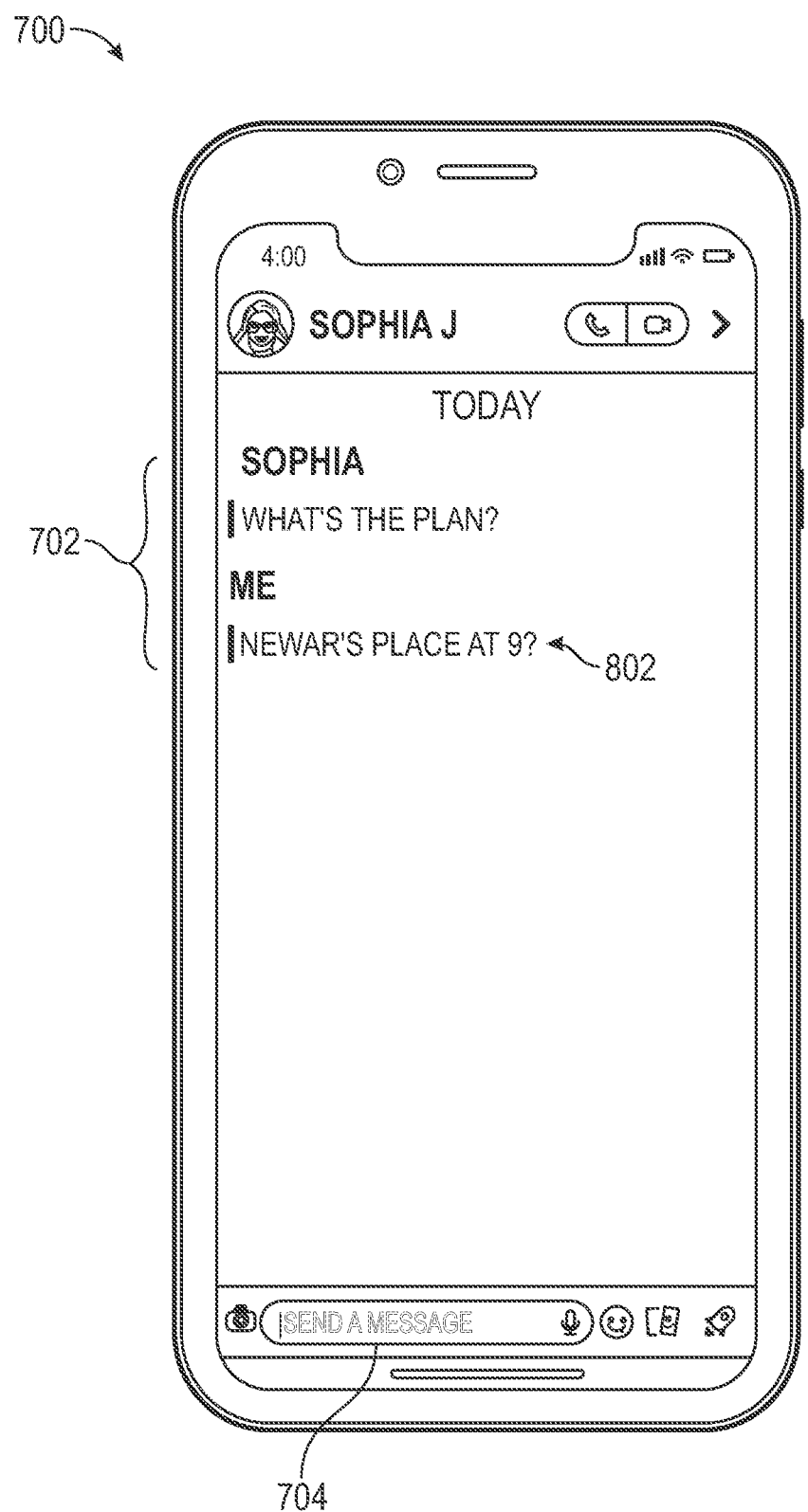
FIG. 8 illustrates a message thread interface in which a text-based term is replaced with replacement text, in accordance with some example embodiments.
Figure 9:
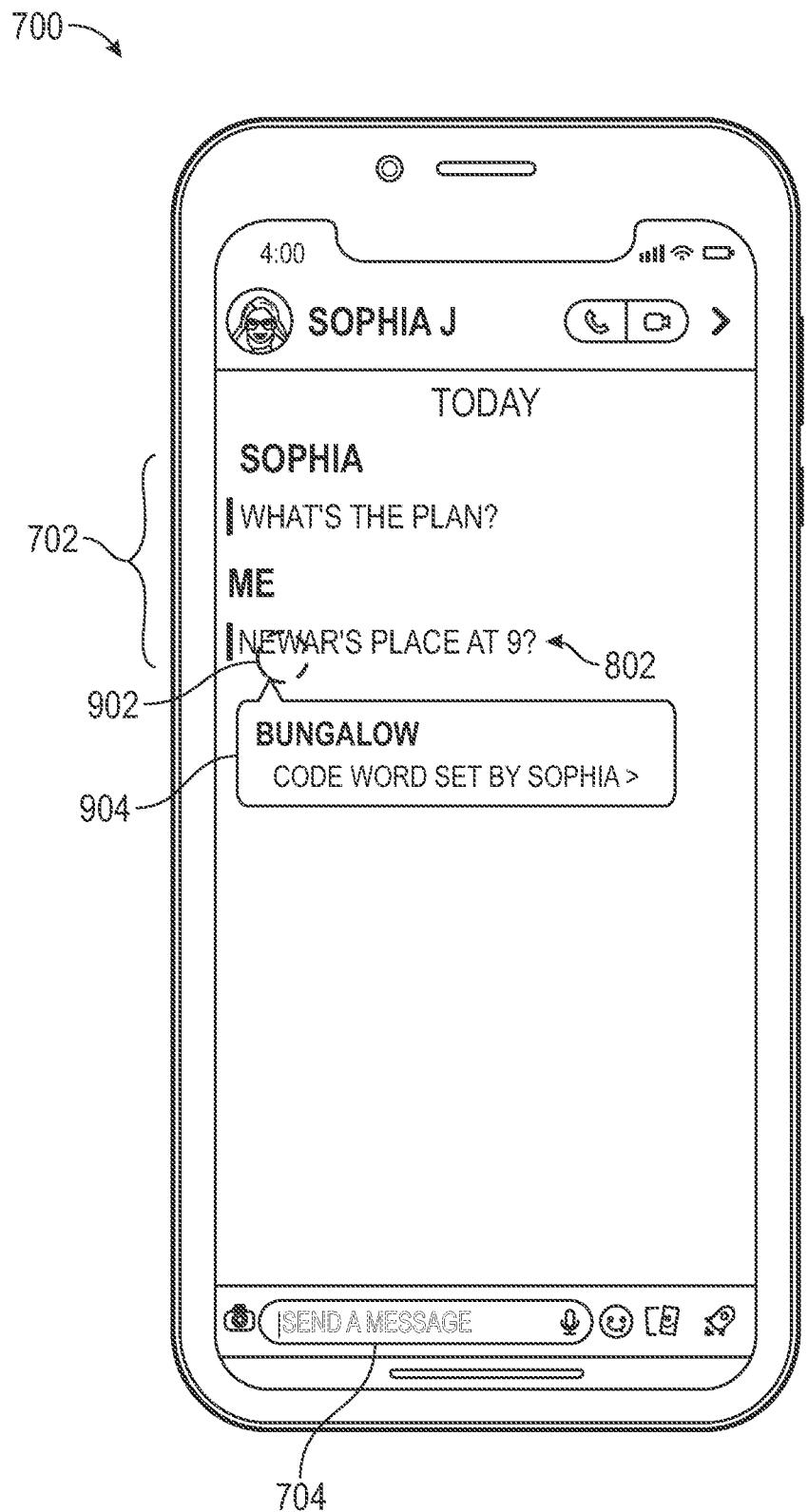
FIG. 9 illustrates a message thread interface in which replacement text is selected by a user to provide additional information, in accordance with some example embodiments.

FIGS. 7-9 illustrate an example of replacing user-input text with replacement text. With respect to FIG. 7, this figure illustrates a message thread interface 700 in which a text-based term 706 is provided within a message input box 704, in accordance with some example embodiments. The message thread interface 700 may present message content (e.g., messages, image, video and/or audio) exchanged between the first user and the second user in association with the messaging system 100. The exchanged content may correspond to a message thread 702. The message thread interface 700 may include a message input box 704 for adding content to the message thread 702.

For example, a user may input text into the message input box 704 using a virtual keyboard, which may include a button (e.g., a "send" button) for submitting the user-inputted text to the message thread 702. In the example of FIG. 7, the user enters a term 706 in the message input box 704, where the term 706 is stored in association with respective replacement content in the replacement terms table 316. The replacement content (e.g., in the form of replacement text) is discussed further below with respect to FIG. 8.

FIG. 8 illustrates the message thread interface 700 in which the text-based term 706 of FIG. 7 is replaced with replacement text 802, in accordance with some example embodiments. As shown, the message thread 702 is updated based on the user input that was provided into the message input box 704 from FIG. 7. However, rather than adding the term 706 to the message thread 702, the messaging server system 108, in conjunction with the replacement terms table 316, provides for display of the replacement text 802 in the message thread 702. As noted above with respect to FIG. 6, the replacement text 802 may be highlighted (e.g., or otherwise displayed in a differentiated manner). The replacement text may be user-selectable, as discussed further below with respect to FIG. 9.

FIG. 9 illustrates the message thread interface 700 in which the replacement text 802 of FIG. 8 is selected by a user to provide additional information, in accordance with some example embodiments. In the example of FIG. 9, a bubble 902 represents user selection (e.g., touch input) of the highlighted replacement text 802. As noted above with respect to FIG. 6, user selection of the replacement text 802 may provide for display of the term that was replaced. In this regard, the message thread 702 may be updated to include a term hint 904, which indicates the originally-typed term (e.g., term 706), as well as which user had specified the term to have replacement content associated therewith.

In one or more implementations, the messaging client application 104 may further provide an option for the user to modify and/or delete the term and its replacement content. For example, selection of such option may launch the above-mentioned list interface which lists all terms and their respective content for modifying and/or deleting select terms.

Figure 10:
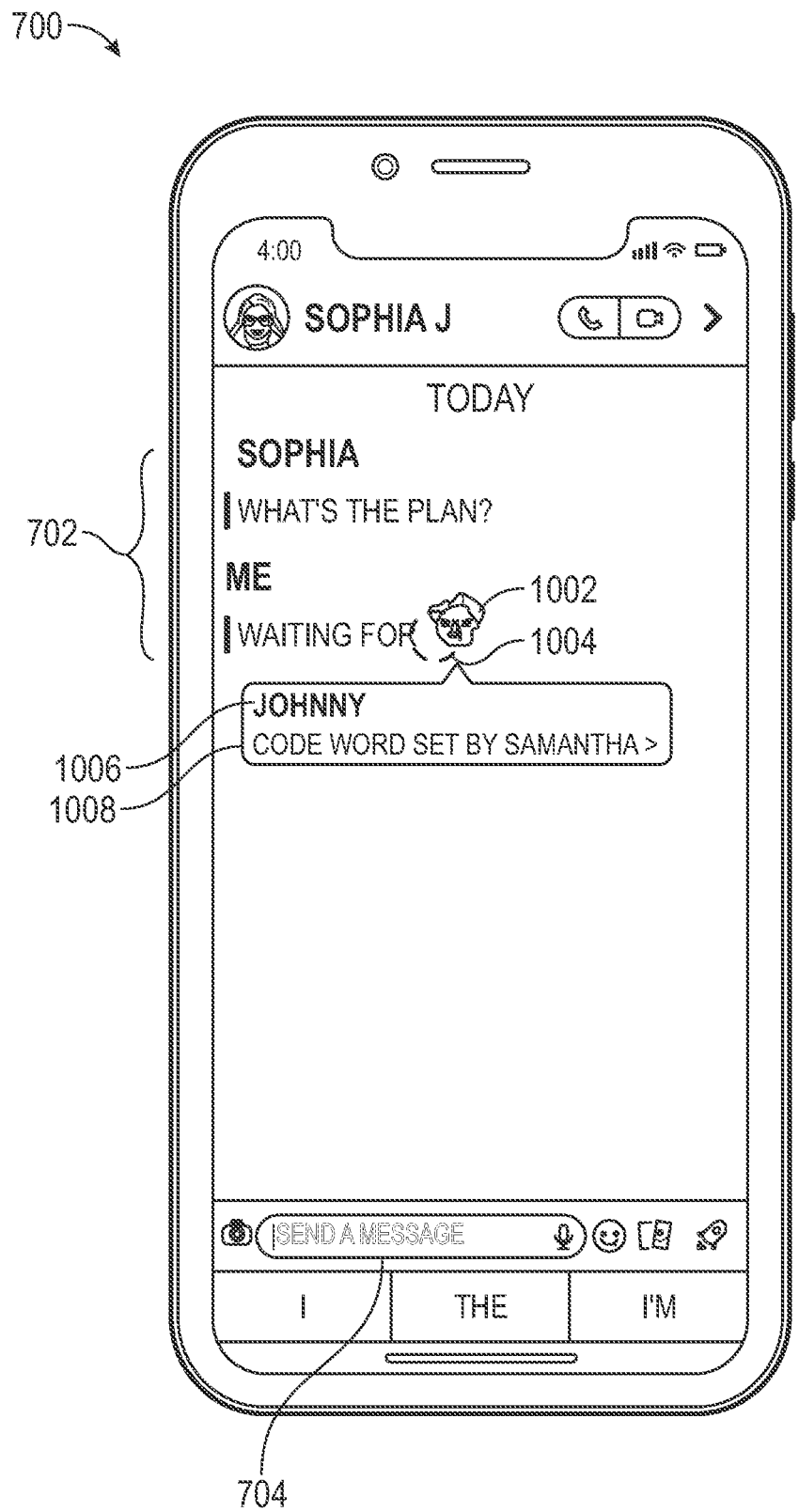
FIG. 10 illustrates a message thread interface in which a text-based term is replaced with a replacement image, in accordance with some example embodiments.

FIG. 10 illustrates the message thread interface 700 in which a text-based term is replaced with a replacement image, in accordance with some example embodiments. In the above examples of FIGS. 7-9, a term input by the user within the message input box 704 is replaced with replacement text 802. The example of FIG. 10 illustrates that a user-inputted term may instead be replaced with a replacement image. As noted above with respect to FIG. 6, replacement content can correspond to one or more of text, image, video, audio and/or any corresponding annotations associated therewith.

In FIG. 10, a user-inputted term 1006 may have been submitted by a user via the message input box 704. In response, the messaging server system 108, in conjunction with the replacement terms table 316, may have determined that the term 1006 has replacement content associated therewith, namely a replacement image 1002. For example, the image can correspond to an emoji, avatar, icon, saved image, a current image captured by a camera of the client device 102, or another type of image.

In response to determining that the term 1006 is associated with the replacement image 1002, the messaging server system 108 may provide for the replacement image 1002 to appear within the message thread 702, in lieu of the term 1006. The replacement image 1002 may be user-selectable, such that user selection of the replacement image 1002 (e.g., as illustrated by the bubble 1004) may provide for a term hint 1008 indicating the originally-typed term (e.g., 1006), as well as which user had specified the term to have replacement content associated therewith. In addition, as noted above, the messaging client application 104 may further provide an option for the user to modify and/or delete the term and its replacement content.

Figure 11:
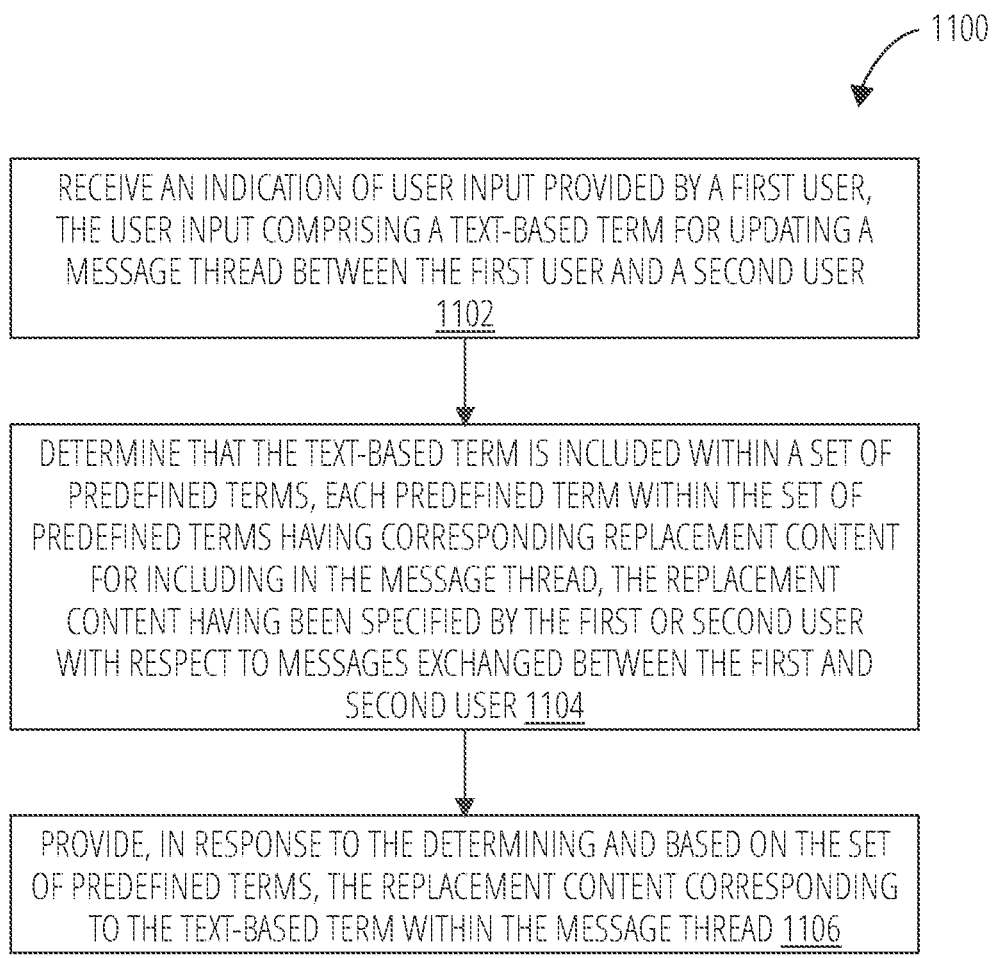
FIG. 11 is a flowchart illustrating a process for replacing a term with replacement content in a message thread, in accordance with some example embodiments.

FIG. 11 is a flowchart illustrating a process 1100 for replacing a term with replacement content in a message thread, in accordance with some example embodiments. For explanatory purposes, the process 1100 is primarily described herein with reference to the messaging server system 108 of FIG. 1. However, one or more blocks (or operations) of the process 1100 may be performed by one or more other components of the messaging server system 108, and/or by other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The messaging server system 108 receives an indication of user input provided by a first user, the user input comprising a text-based term for updating a message thread between the first user and a second user (block 1102).

The messaging server system 108 determines that the text-based term is included within a set of predefined terms (block 1104). Each predefined term within the set of predefined terms has corresponding replacement content for including in the message thread, the replacement content having been specified by the first or second user with respect to messages exchanged between the first and second user.

The set of predefined terms may be specific and/or unique to the message thread. The replacement content may include text. Alternatively or in addition, the replacement content may include image, video or audio data. The replacement content may be provided within the message thread in lieu of displaying the text-based term within the message thread.

The messaging server system 108 may provide a user interface to display each predefined term within the set of predefined terms and the respective replacement content for that predefined term. The user interface may provide for adding, deleting or modifying at least one of a predefined term within the set of predefined terms or the respective replacement content for that predefined term.

The messaging server system 108 provides, in response to the determining and based on the set of predefined terms, the replacement content corresponding to the text-based term within the message thread (block 1106). The messaging server system 108 may provide for highlighting the replacement content within the message thread, and displaying the text-based term in response to user selection of the highlighted replacement content.

Figure 12:
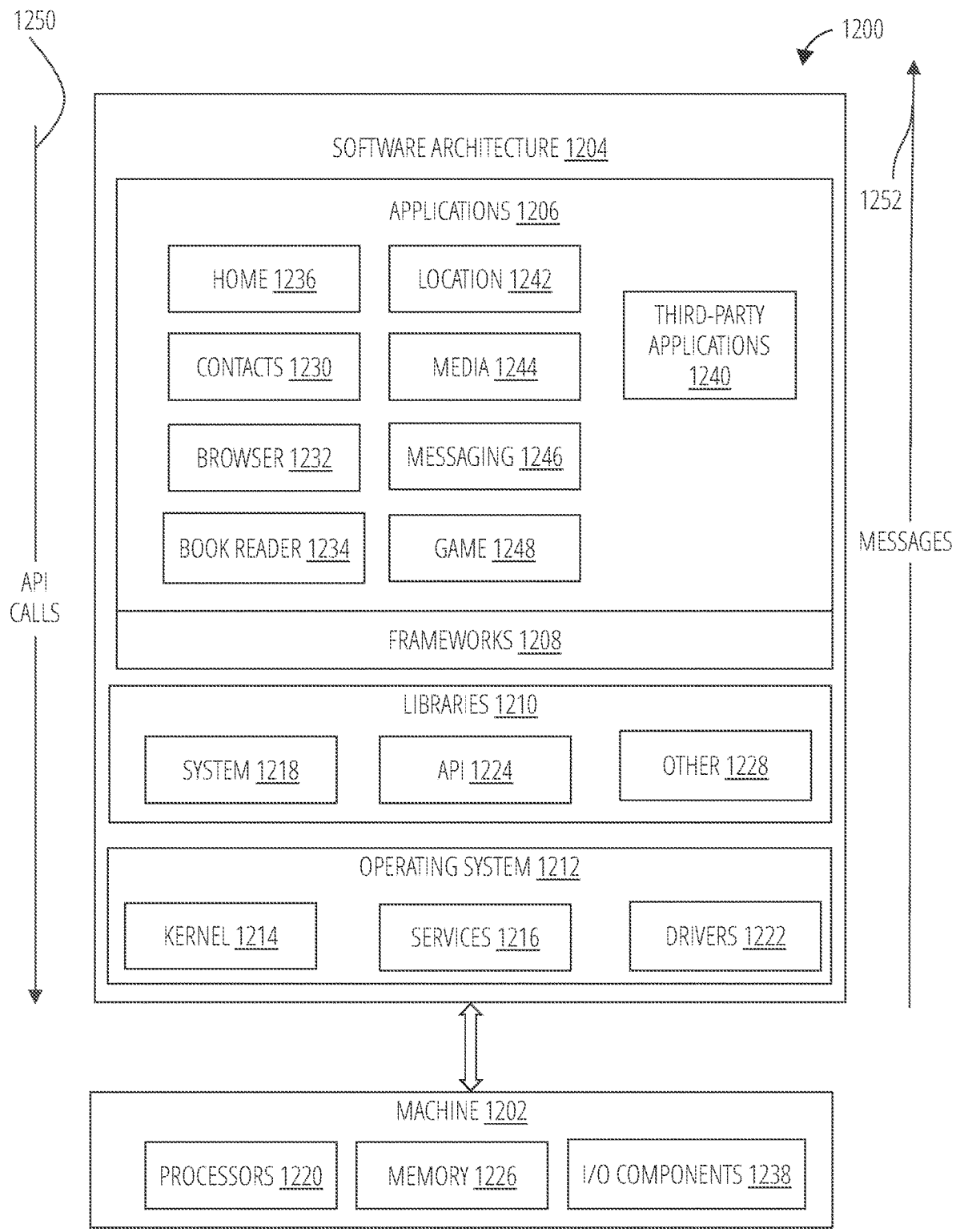
FIG. 12 is block diagram showing a software architecture within which the present disclosure may be implemented, in accordance with some example embodiments.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246 (e.g., corresponding to the messaging client application 104), a game application 1248, and a broad assortment of other applications such as third-party applications 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1240 (e.g., applications developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party applications 1240 can invoke the API calls 1250 provided by the operating system 1212 to facilitate functionality described herein.

Figure 13:
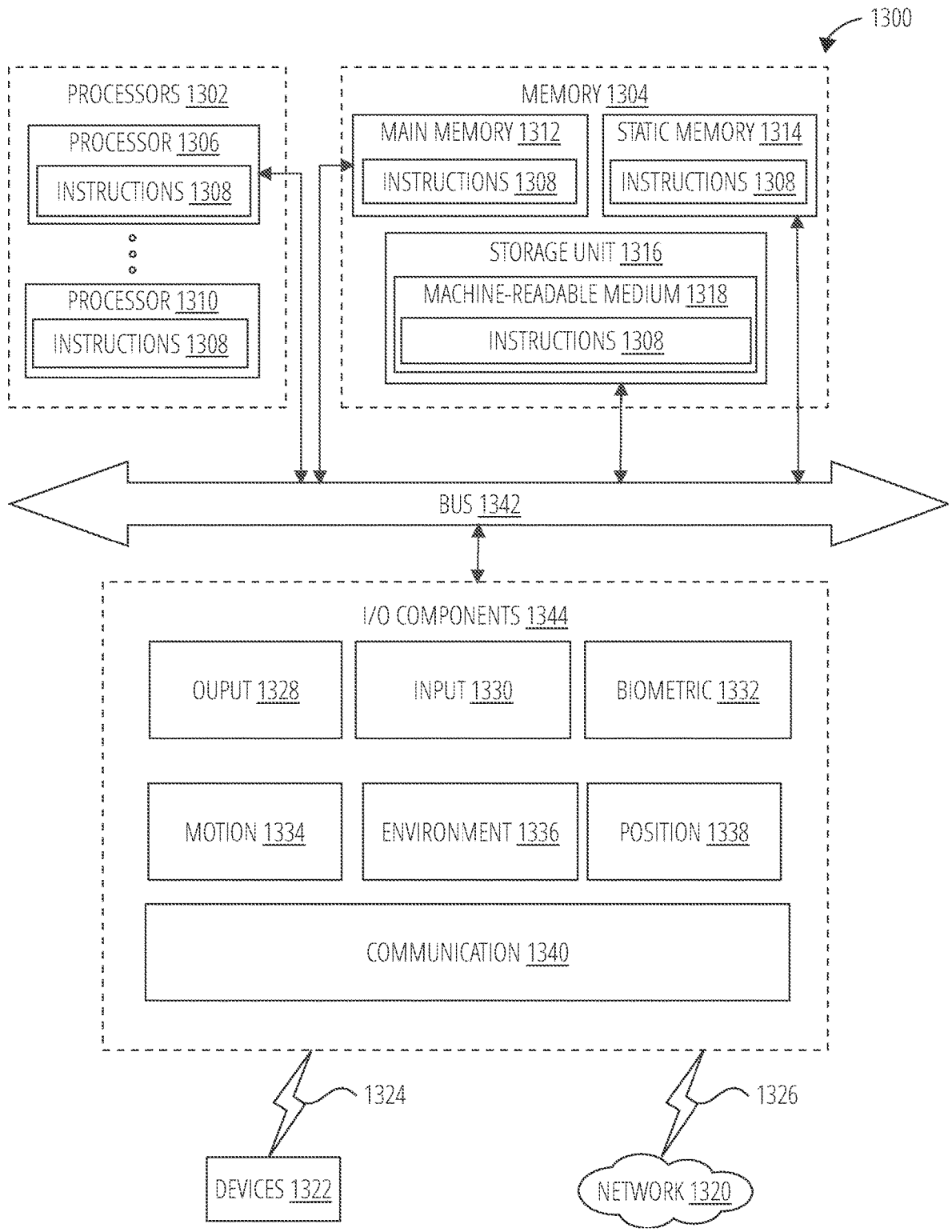
FIG. 13 is a diagrammatic representation of a machine, in the form of a computer system within which a set of instructions may be executed for causing the machine to perform any one or more of the methodologies discussed, in accordance with some example embodiments.

FIG. 13 is a diagrammatic representation of a machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1344, which may be configured to communicate with each other via a bus 1342. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1342. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1344 may include a wide variety of components to receive input, provide output, produce output, transmit information, exchange information, capture measurements, and so on. The specific I/O components 1344 that are included in a particular machine will depend on the type of machine. For example, portable machines such as mobile phones may include a touch input device or other such input mechanisms, while a headless server machine will likely not include such a touch input device. It will be appreciated that the I/O components 1344 may include many other components that are not shown in FIG. 13. In various example embodiments, the I/O components 1344 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1344 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1344 further include communication components 1340 operable to couple the machine 1300 to a network 1320 or devices 1322 via a coupling 1326 and a coupling 1324, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1324 (e.g., a peer-to-peer coupling) to the devices 1322.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
receiving an indication of user input provided by a first user, the user input comprising a text-based term for updating a message thread between the first user and a second user;
determining that the text-based term is included within a set of predefined terms, each predefined term within the set of predefined terms having corresponding replacement content for including in the message thread, the replacement content having been specified by one of the first or second user with respect to messages exchanged between the first and second user;
providing, in response to the determining and based on the set of predefined terms, the replacement content corresponding to the text-based term within the message thread;
providing for differentiated display of the replacement content within the message thread; and providing a notification that identifies which one of the first user or the second user specified the replacement content.

2. The method of claim 1, wherein the set of predefined terms is specific to the message thread.

3. The method of claim 1, wherein the replacement content comprises text.

4. The method of claim 1, wherein the replacement content comprises image, video or audio data.

5. The method of claim 1, wherein the replacement content is provided within the message thread in lieu of displaying the text-based term within the message thread.

6. The method of claim 1,
wherein the notification further includes the text-based term.

7. The method of claim 1, further comprising:
providing a user interface to display each predefined term within the set of predefined terms and the respective replacement content for that predefined term.

8. The method of claim 7, wherein the user interface provides for adding, deleting or modifying at least one of a predefined term within the set of predefined terms or the respective replacement content for that predefined term.

9. A system comprising:
a processor; and
a memory including instructions that, when executed by the processor, cause the processor to perform operations comprising:
receiving an indication of user input provided by a first user, the user input comprising a text-based term for updating a message thread between the first user and a second user;
determining that the text-based term is included within a set of predefined terms, each predefined term within the set of predefined terms having corresponding replacement content for including in the message thread, the replacement content having been specified by the first or second user with respect to messages exchanged between the first and second user;
providing, in response to the determining and based on the set of predefined terms, the replacement content corresponding to the text-based term within the message thread;
providing for differentiated display of the replacement content within the message thread; and
providing a notification that identifies which one of the first user or the second user specified the replacement content.

10. The system of claim 9, wherein the set of predefined terms is specific to the message thread.

11. The system of claim 9, wherein the replacement content comprises text.

12. The system of claim 9, wherein the replacement content comprises image, video or audio data.

13. The system of claim 9, wherein the replacement content is provided within the message thread in lieu of displaying the text-based term within the message thread.

14. The system of claim 9,
wherein the notification further includes the text-based term.

15. The system of claim 9, the operations further comprising:
providing a user interface to display each predefined term within the set of predefined terms and the respective replacement content for that predefined term.

16. The system of claim 15, wherein the user interface provides for adding, deleting or modifying at least one of a predefined term within the set of predefined terms or the respective replacement content for that predefined term.

17. A non-transitory computer-readable medium comprising instructions, which when executed by a computing device, cause the computing device to perform operations comprising:
receiving an indication of user input provided by a first user, the user input comprising a text-based term for updating a message thread between the first user and a second user;
determining that the text-based term is included within a set of predefined terms, each predefined term within the set of predefined terms having corresponding replacement content for including in the message thread, the replacement content having been specified by the first or second user with respect to messages exchanged between the first and second user;
providing, in response to the determining and based on the set of predefined terms, the replacement content corresponding to the text-based term within the message thread;
providing for differentiated display of the replacement content within the message thread; and
providing a notification that identifies which one of the first user or the second user specified the replacement content.

18. The non-transitory computer-readable medium of claim 17, wherein the set of predefined terms is specific to the message thread.

19. The non-transitory computer-readable medium of claim 17, wherein the replacement content comprises text.

20. The non-transitory computer-readable medium of claim 17, wherein the replacement content comprises image, video or audio data.

* * * * *